United States Patent
Gredler et al.

(10) Patent No.: US 9,350,654 B1
(45) Date of Patent: May 24, 2016

(54) MICROLOOP PROTECTION FOR MULTI-PROTOCOL LABEL SWITCHING PATHS

(71) Applicant: Juniper Networks, Inc., Sunnyvale, CA (US)

(72) Inventors: Hannes Gredler, Pillberg (AT); Ina Minei, Mountain View, CA (US); Zhaohui Zhang, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 239 days.

(21) Appl. No.: 14/023,396

(22) Filed: Sep. 10, 2013

Related U.S. Application Data (60) Provisional application No. 61/847,604, filed on Jul. 18, 2013.

(51) Int. Cl.
  *H04L 12/723* (2013.01)
(52) U.S. Cl.
  CPC .................................. *H04L 45/507* (2013.01)
(58) Field of Classification Search
  None
  See application file for complete search history.

(56) References Cited

U.S. PATENT DOCUMENTS

| | | | |
|---|---|---|---|
| 7,184,437 B1 | 2/2007 | Cole et al. | |
| 7,483,387 B2 * | 1/2009 | Guichard et al. | 370/252 |
| 7,564,803 B1 * | 7/2009 | Minei et al. | 370/254 |
| 7,889,711 B1 * | 2/2011 | Minei et al. | 370/351 |
| 7,929,557 B2 * | 4/2011 | Kompella | 370/401 |
| 7,948,986 B1 * | 5/2011 | Ghosh et al. | 370/392 |
| 8,477,795 B2 * | 7/2013 | Kini et al. | 370/401 |
| 8,724,629 B1 * | 5/2014 | Goli et al. | 370/392 |
| 8,891,553 B2 * | 11/2014 | Guichard et al. | 370/474 |
| 2008/0044181 A1 | 2/2008 | Sindhu | |
| 2011/0022728 A1 * | 1/2011 | Kern et al. | 709/242 |

OTHER PUBLICATIONS

Andersson et al. "LDP Specification" Network Working Group, RFC 5036, Oct. 2007, 136 pgs.
Callon, R. "Use of OSI IS-IS for Routing in TCP/IP and Dual Environments" Network Working Group, RFC 1195, Dec. 1990, 84 pgs.
Moy, J. "OSPF Version 2" Network Working Group, RFC 2328, Apr. 1998, 215 pgs.
Rosen et al. "Multiprotocol Label Switching Architecture" Network Working Group, RFC 3031, Jan. 2001, 61 pgs.

* cited by examiner

*Primary Examiner* — Timothy J Weidner
(74) *Attorney, Agent, or Firm* — Shumaker & Sieffert, P.A.

(57) ABSTRACT

Techniques of this disclosure enable loop protection for networks that utilize hop-by-hop routing, such as networks that utilize multi-protocol label switching (MPLS) label distribution and interior gateway protocol (IGP) routing. As described herein, the techniques provide protection from any small transient loops that may emerge due to link failure or other topology change events in networks that utilize hop-by-hop routing techniques.

15 Claims, 4 Drawing Sheets

MICROLOOP PROTECTION FOR MULTI-PROTOCOL LABEL SWITCHING PATHS

PRIORITY CLAIM

This application claims the benefit of U.S. Provisional Application No. 61/847,604, filed Jul. 18, 2013, the entire content of which is being incorporated herein by reference.

TECHNICAL FIELD

The disclosure relates to computer networks and, more particularly, to forwarding network traffic within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Routing devices within a network, often referred to as routers, maintain routing information that describe available routes through the network. Upon receiving an incoming packet, the router examines information within the packet and forwards the packet in accordance with the routing information. In order to maintain an accurate representation of the network, routers exchange routing information in accordance with one or more defined routing protocol, such as an interior gateway protocol (IGP). An interior gateway protocol may be a distance-vector protocol or a link state protocol. With a typical link state routing protocol, the routers exchange information related to available interfaces, metrics and other variables associated with links between network devices. This allows the routers to each construct a complete topology or map of the network. Some examples of link state protocols include the Open Shortest Path First (OSPF) protocol and the Intermediate-System to Intermediate System (IS-IS) protocol.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Label Distribution protocol (LDP) or the Resource Reservation Protocol with Traffic Engineering extensions (RSVP-TE), label switching routers can forward traffic along a particular path through a network to a destination device, i.e., a Label Switched Path (LSP), using labels prepended to the traffic. An LSP defines a distinct path through the network to carry MPLS packets from the source device to a destination. Using a MPLS protocol, each router along an LSP allocates a label in association with the destination and propagates the label to the closest upstream router along the path. Routers along the path add or remote the labels and perform other MPLS operations to forward the MPLS packets along the established path.

SUMMARY

In general, the techniques of this disclosure enable loop protection for networks that utilize hop-by-hop routing, such as networks that utilize multi-protocol label switching (MPLS) label distribution and interior gateway protocol (IGP) routing. As described herein, the techniques provide protection from any small transient loops that may emerge due to link failure or other topology change events in networks that utilize hop-by-hop routing techniques.

In one example, a method comprises advertising, out each of a plurality of network interfaces of a label switching router and via a respective label distribution protocol (LDP) label mapping message, a label to be used in forwarding to the label switching router traffic to a destination within a network. The method further comprises computing, with the label switching router, a path within the network to be used when forwarding the network traffic from the label switching router to the destination within the network. In addition, the method comprises receiving, a packet on one of the network interfaces of the label switching router, wherein the packet includes the label advertised by the label switching router, and discarding, with the label switching router, the packet when the network interface from which the packet was received corresponds to the path computed by the label switching router to be used when forwarding network traffic from the label switching router to the destination.

In another example, a label switching router comprises a plurality of network interfaces, a routing engine and a forwarding circuit. The routing engine comprises a processor executing a label distribution protocol configured to advertise, out each of the plurality of network interfaces, a label to be used by peer label switching routers when forwarding, to the label switching router, network traffic associated with a destination within a network. The forwarding circuit is programmed with forwarding information associated with a path within the network for forwarding the network traffic from the label switching router to the destination. The forwarding circuit receives a packet on one of the network interfaces, the packet including the label advertised by the label switching router, and discards the packet when the network interface from which the packet was received corresponds to the path specified by the forwarding information to be used when forwarding network traffic from the label switching router to the destination.

In another example, a method comprises receiving, with a label switching router, a label distribution protocol (LDP) request message from a peer label switching router, wherein the LDP request message requests a label to be used in forwarding traffic to a destination within a network, and computing, with the label switching router, a path within the network to be used when forwarding the network traffic from the label switching router to the destination within the network. The method further comprises advertising, out each of a plurality of network interfaces of the label switching router and via a respective label LDP label mapping message, the label to be used in forwarding to the label switching router traffic to the destination within the network, and suppressing the LDP label mapping messages from one or more network interfaces that correspond to the path computed by the label switching router to be used when forwarding network traffic from the label switching router to the destination.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
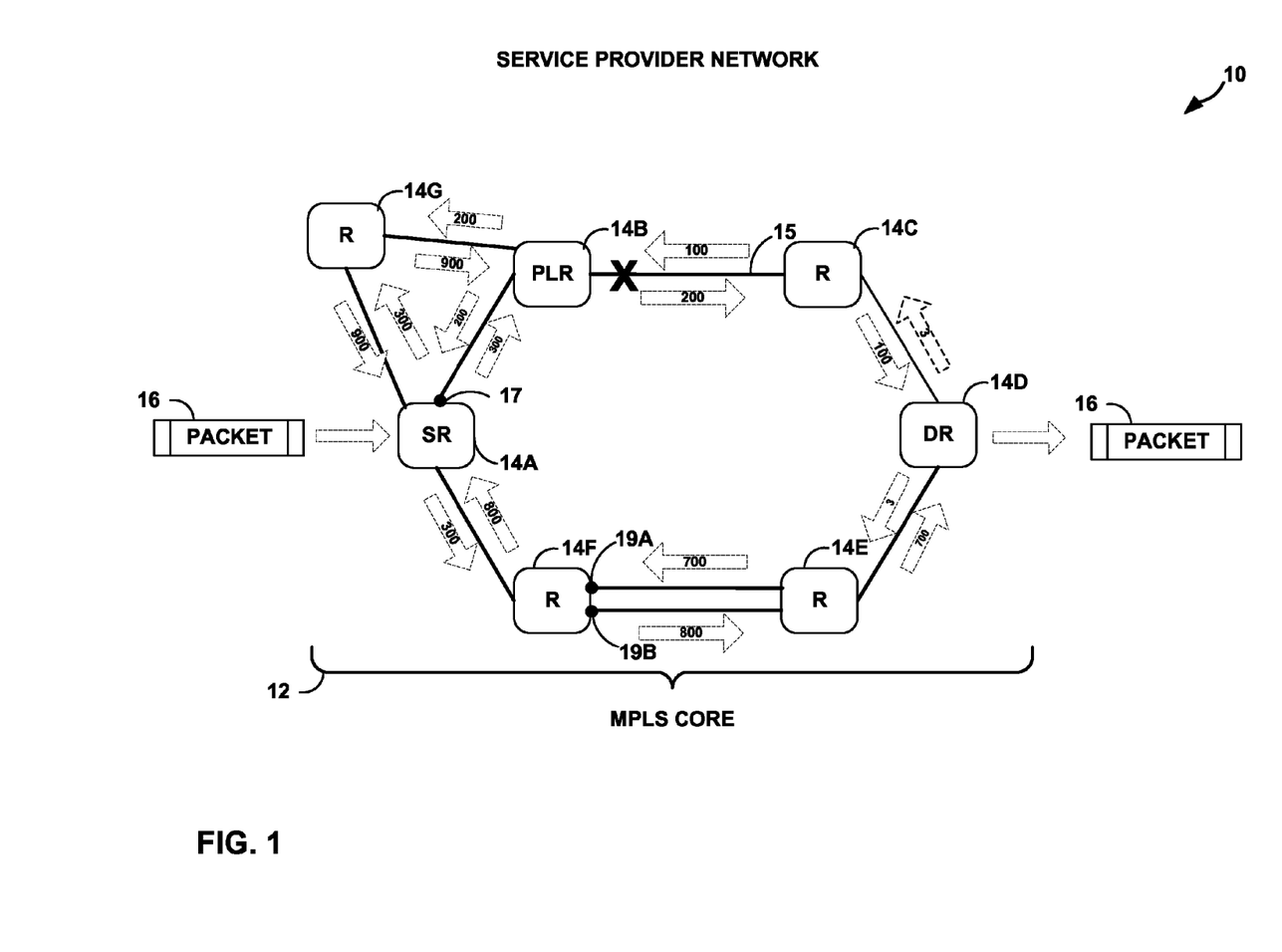
FIG. 1 is a block diagram illustrating an example network including routers configured to provide microloop protection in accordance with the techniques described herein.

FIG. 1 is a block diagram illustrating an example network 10 including label swapping routers 14A-14G (collectively, "routers 14") configured to provide forward traffic using IGP-distributed per-neighbor labels. As described herein, one or more of routers 14 is configured in accordance with one or more of the techniques described herein to provide protection against any small transient loops (also referred to herein as "microloops") that may emerge due to link failure or other topology change events.

In the example of FIG. 1, routers 14 of network 10 includes a source router 14A that operates to ingress or otherwise source network packet 16, a point of local repair (PLR) router 14B, a destination router (DR) 14D, and transit routers 14C, 1E-14G. In this way, routers 14 of network 10 provide an MPLS core for forwarding network packet 16. In some example, source router 14A and destination router 14D may be connected to one or more customer devices (not shown) with access to network 10.

Routers 14 in network 10 each maintain routing information that describes available routes through network 10. Upon receiving an incoming packet, each of the routers examines information within the packet and forwards the packet in accordance with the routing information. In order to maintain an accurate representation of network 10, routers 14 exchange routing information, e.g., bandwidth availability of links, in accordance with a defined routing protocol, such as an Interior Gateway Protocol (IGP). For example, each of the routers may use a link-state routing protocol, such as the Open Shortest Path First (OSPF) protocol or the Intermediate-System to Intermediate System (IS-IS) protocol, to exchange link-state routing information to learn the topology of network 10. Further details regarding OSPF are found in Moy, J., "OSPF Version 2," RFC 2328, April 1998, the entire contents of which are incorporated by reference herein. Further details regarding IS-IS are found in Callon, R., "Use of OSI IS-IS for Routing in TCP/IP and Dual Environments," RFC 1195, December 1990, the entire contents of which are incorporated by reference herein.

In this example, routers 14 exchange Label Distribution Protocol (LDP)-distributed labels in accordance with the Label Distribution Protocol. That is, each of routers 14 operates as a label switching router (LSR) and distributes labels to neighboring LSRs within network 10 to support MPLS forwarding along routed paths within network 10. Routers 14 issue LDP label mapping messages to advertise labels to LDP peers for use in forwarding network traffic associated with a Forwarding Equivalence Class (FEC) to an identified destination. In other words, the label mapping messages advertise FEC-label bindings to the LDP peers.

Figure 2:
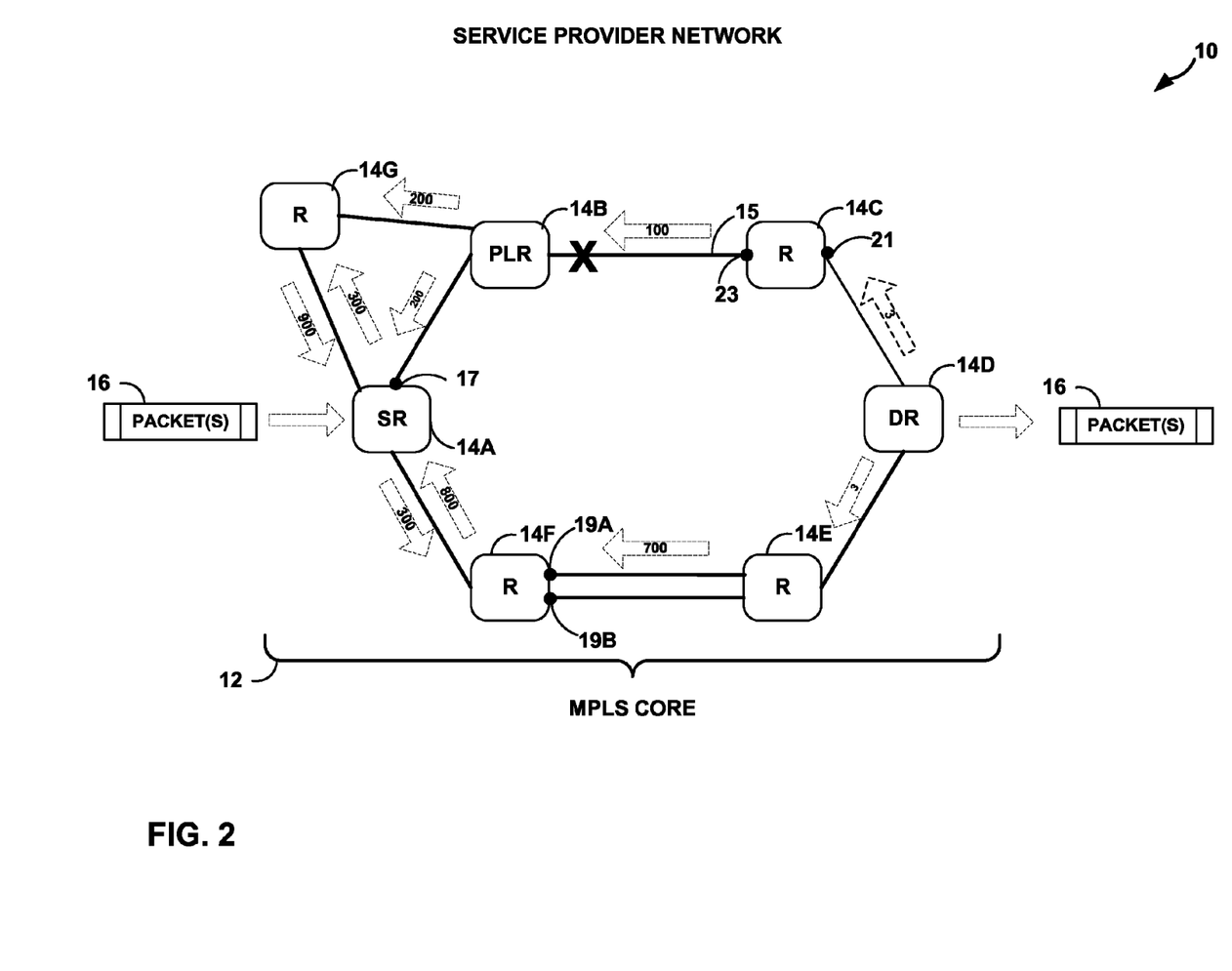
FIG. 2 is a block diagram further illustrating the network of FIG. 1 providing microloop protection in accordance with the techniques described herein.

In this example, routers 14 are shown as issuing LDP label mapping messages to advertise labels associated with a FEC associated with destination router 14D. Moreover, in the example implementation of FIG. 1, each of routers 14 operate in accordance with conventional LDP and issue the LDP label mapping messages out each network interface the router. In the example of FIG. 2, destination router 14D may issue LDP label mapping messages advertising label "3" to neighboring routers 14C and 14E to advertise label "3" for use in forwarding traffic destined for the FEC associated with destination router 14D. Similarly, router 14C allocates a label "100" and issues LDP messages on all of its network interfaces so as to advertise the label "100" to neighboring routers for forwarding traffic to the FEC associated with destination router 14D. Router 14E allocates and announces label "700" on its network interfaces for use in forwarding traffic to the FEC associated with destination router 14D. This process continues and routers 14A, 14B, 14F and 14G similarly locally allocate and announce via LDP label mapping messages labels "300," "200," "800" and "900," respectively, on each of their respective interfaces for use in forwarding traffic to the FEC associated with destination router 14D. In some examples, routers 14 may operate in a mode (e.g., downstream unsolicited LDP) such that the routers output specific requests, e.g., LDP request messages, to explicitly request the assignment and advertisement of labels for a FEC associated with destination router 14D, such as an IP address of destination router 14 or a customer network or device (not shown) coupled to the destination router. Alternatively, routers 14 may operate in a mode (e.g., downstream unsolicited LDP) in which specific request are not used.

In this way, according to LDP, the setup and allocation of labels within MPLS core 12 for forwarding traffic to the FEC associated with destination router 14D is initiated by router 14D and the labels are downstream-assigned such that each downstream router assigns itself a label to be used by other routers when forwarding traffic to that router for a particular destination.

In the illustrated example of FIG. 1, upon receiving an LDP label mapping message announcing a label in association with a FEC, each of routers 14 performs path selection for the FEC using topology information learned by way of the interior gateway protocol to compute a shortest path within network 10 toward egress router 14D on a hop-by-hop basis based on the routing information maintained by the routers. Each of routers 14 may then select a next hop along the locally computed shortest path and install forwarding information associated with the selected next hop in a forwarding plane of the router, wherein the forwarding information identifies a network interface to be used when forwarding traffic to destination router 14D and a label to be used when forwarding the traffic out the interface. The routers use the next hops with the assigned labels to forward traffic hop-by-hop to destination router 14D.

In the example of FIG. 1, based on the IGP topology information and metrics, source router 14A computes the shortest path to destination router 14D as {14A, 14B, 14C, 14D} and selects router 14B as a next hop to which to forward network packet 16 destined for destination router 14D. In operation, source router 14A receives network packet 16 destined for destination router 14D and, in accordance with the forwarding information previously computed, prepends label "200" to the traffic and forwards the network packet to the neighboring router 14B. Upon receiving network packet 16, router 14B removes label "200" from the packet, prepends label "100" to the network packet and forwards the traffic to the neighboring router 14C. Router 14C removes label "100" from the packet, prepends label "3" to the network packet and forwards the traffic to the neighboring router 14C.

In this way, routers 14 utilize hop-by-hop forwarding mechanisms for MPLS network 12 based on labels distributed using LDP and in accordance with IP topology information communicated via IGP. In this example, each of routers 14 advertises, to each of its directly connected neighbor interfaces, a label in association with a FEC.

As described herein, one or more of routers 14 is configured in accordance with one or more of the techniques described herein to provide protection against any small transient loops (also referred to herein as "microloops") that may emerge due to link failure or other topology change events. For example, conventional networks utilizing IP-based hop-by-hop routing may experience short-term microloops that may provide substantial congestion on one or more links. As a specific example, PLR router 14 may discover that link 15 between PLR router 14B and transit router 14C has failed and, in response, recomputes the shortest path for reaching destination router 14D as {14B, 14A, 14F, 14E, 14D}. Upon reprogramming its forwarding plane, PLR router 14B forwards traffic destined for destination router 14D to source router 14A using label "300" allocated by the source router. In some situations, the IGP routing protocol on source router 14A may not yet have learned of the failure of link 15 and/or completed path selection and forwarding plane reprogramming. In such cases, a router employing conventional techniques may forward the traffic in accordance with the currently selected shortest path, i.e., to PLR router 14B using label "200." In such an example, a potentially highly-problematic microloop would otherwise be formed between source router 14A and PLR router 14B in which traffic loops between the routers and ultimately consumes all of available bandwidth until the IGP of source router 14A converges and computes a new shortest path to destination router 14B by way of router 14F.

As described, routers 14 are configured in accordance with one or more of the techniques described herein to provide protection against such microloops that may emerge due to link failure or other topology change events. In one example implementation, when installing a next hop for forwarding traffic associated with a given label, each of routers 14, such as source router 14A, computes a list of excluded interfaces when performing route resolution and installs the list of excluded interfaces into the forwarding plane of the router. The list of excluded interfaces represents a list of input interfaces for that router from which traffic associated with the label is not to be forward but, instead, discarded. For example, as explained above, source router 14A computes the shortest path to destination router 14D as {14A, 14B, 14C, 14D} based on the IGP topology information and metrics and selects router 14B as a next hop to which to forward network packet 16 destined for destination router 14D. At this time, source router 14A installs forwarding information identifying interface 17 to be used when forwarding traffic to destination router 14D and label "200" to be used when forwarding the traffic out the interface. In addition, source router 14A identifies interface 17 as an excluded interface, i.e., an interface for which if traffic destined for destination router 14B is received, the traffic is discarded and not forwarded.

In the event of a topology change, such as failure of link 15 as described above, any traffic destined for destination router 14D received from interface 17 would, therefore be discarded by source router 14A. For example, a forwarding plane of source router 14A detects inbound network traffic received on interface 17 having label 200, selects a next hop for the inbound traffic based on the label 200 and the set of excluded interfaces and, based on the excluded interface 17, discards the network traffic. In this way, an exclusion list computed by source router 17 and installed within a forwarding plane of the router operates to protect against a microloop that may otherwise be created in the event PLR router 14B detects and reacts to failure of link 15 before source router 14A. Upon detection of the link failure and completion of path selection by source router 14A, the source router recomputes the shortest path for reaching destination router 14D as {14A, 14F, 14E, 14D}. At this time, source router 14A installs an updated next hop for forwarding traffic associated with a given label (e.g., packet 16), and installs an updated list of excluded interfaces into the forwarding plane of the router.

In some examples, the list of excluded interfaces may comprise a plurality of excluded interfaces. For example, initially, router 14F computes the shortest path to destination router 14D as {14F, 14E, 14D} based on the IGP topology information and metrics and selects router 14E as a next hop to which to forward network packet 16 destined for destination router 14D. At this time, source router 14F installs forwarding information identifying interfaces 19A and 19B to be used when forwarding traffic to destination router 14D in equal cost multipath (ECMP) fashion, and specifies label "700" to be used when forwarding the traffic out the interfaces. In addition, router 14F programs a list specifying interfaces 19A and 19B as excluded interfaces, i.e., a set of interfaces for which if traffic destined for destination router 14B is received, the traffic is discarded and not forwarded.

It should be noted that the labels may be stacked recursively or otherwise used in hierarchical fashion within a label stack. For example, a router could construct an explicit LSP or tunneled LSP by pushing N per-neighbor labels on the label stack. In such cases, when forwarding MPLS traffic, the forwarding plane of each router 15 may examine the inner label to determine whether network traffic has been received on an interface of a list of excluded interfaces and, therefore, should be discarded.

The techniques of this disclosure may provide several advantages. For example, the techniques may help avoid potentially problematic microloops that may otherwise emerge in MPLS networks due to topology changes or other network events. Moreover, the techniques do not require changes to the label distribution protocol (e.g., LDP) used within such network and, therefore, allocation and advertisement of platform-wide (interface independent) labels need not change. This may be advantageous in that code bases associated with MPLS protocols executing in control planes of routers 14 need not be modified. Moreover, the techniques allow for incremental deployment in that implementation of microloop protection using excluded lists in the forwarding plane of a given router need not impact the operation of other routers within the system. Further, the techniques do not make any assumption regarding the timing of convergence of path selection and forwarding state changes within the forwarding planes of routers 14 and, therefore, may be very robust for different network topologies.

FIG. 2 is a block diagram illustrating another example in which routers 14 are configured in accordance with one or more of the techniques described herein to provide protection against any small transient loops (also referred to herein as "microloops") that may emerge due to link failure or other topology change events. In the example of FIG. 2, the label distribution protocol (e.g., LDP) operating within one or more of routers 14 may be modified to preempt the possibility of formation of transient microloops. In this example, unlike the example of FIG. 1, the label distribution protocol within one or more of routers 14 does not operate in accordance with conventional LDP and does not issue the LDP label mapping messages out each network interface the router. Instead, the label distribution protocol of one or more of routers 14 operates in accordance with a modified signaling process when advertising a label to be used in reaching a given FEC. That is, the label distribution protocol of one or more routers 14 suppresses the advertisement of the label from the interface that leads along a selected shortest path to the destination.

For example, similar to the example of FIG. 1, destination router 14D issues LDP messages advertising label "3" to neighboring routers 14C and 14E, thereby advertising label "3" for use in forwarding traffic destined for the FEC associated with destination router 14D. In response, router 14C performs a shortest path computation and determines that the shortest path for reaching destination router D is via interface 21. As a result, router 14C allocates a label "100" and issues LDP messages on network interface 23 so as to advertise the label "100" to neighboring PLR router 14B for forwarding traffic to the FEC associated with destination router 14D but suppresses the advertisement of the label from interface 21. Similarly, router 14E allocates and announces label "700" on its interfaces leading to router 14F for use in forwarding traffic to the FEC associated with destination router 14D but suppresses the label advertisement on its network interface leading to destination router 14D. This process continues and routers 14A, 14B, 14F and 14G similarly locally allocate and announce, via LDP label mapping messages, labels "300," "200," "800" and "900," respectively, on each of their interfaces for use in forwarding traffic to the FEC associated with destination router 14D while suppressing the label mapping messages on interfaces that lead along the computed shortest path selected by each of the routers for reaching the destination router. For example, as shown, source router 14A, based on the IGP topology information and metrics, computes the shortest path to destination router 14D as {14A, 14B, 14C, 14D} and selects router 14B as a next hop to which to forward network packet 16 destined for destination router 14D. As such, source router 14A allocates and announces label "300" on all of its network interfaces but does not issue a label mapping message out interface 17 leading to PLR router 14B. That is, source router 14A suppresses the label announcement on interface 17 since the interface leads to a nexthop router (PLR router 14B) that lies along the selected shortest path for use in forwarding traffic to destination router 14B. In this way, routers 14 are configured in accordance with one or more of the techniques described herein to provide protection against such microloops that may emerge due to link failure or other topology change events. In this example implementation, a microloop between source router 14A and PLR router 14B may be avoided in the event link 15 fails. That is, in the event of a topology change, such as failure of link 15 as described above, any traffic destined for destination router 14D received by PLR 14B would, therefore be discarded by PLR router 14B since it has received no other labels to be used for forwarding the traffic.

For example, in operation, source router 14A receives network packet 16 destined for destination router 14D and, in accordance with the forwarding information previously computed, prepends label "200" to the traffic and forwards the network packet to the neighboring router 14B. Upon receiving network packet 16, router 14B removes label "200" from the packet, prepends label "100" to the network packet and forwards the traffic to the neighboring router 14C. Router 14C removes label "100" from the packet, prepends label "3" to the network packet and forwards the traffic to the neighboring router 14C. Upon detection of the link failure and completion of path selection by source router 14A, the source router recomputes the shortest path for reaching destination router 14D as {14A, 14F, 14E, 14D}. At this time, source router 14A installs an updated next hop for forwarding traffic associated with a given label (e.g., packet 16), advertises label "300" to PLR router 14B in association with the FEC for destination router 14D and withdraws label "300" from router 14F since router 14F now lies along the path to destination router 14D.

These techniques may provide several advantages. For example, the techniques may help avoid potentially problematic microloops that may otherwise emerge in MPLS networks due to topology changes or other network events. Moreover, the techniques described with respect to FIG. 2 utilize only local changes to the label distribution protocol (e.g., LDP) executing within the control and plane of one or more of routers 14. This may be advantageous in that changes need not be made to the data plane (forwarding logic) of routers 14. Moreover, the techniques allow for incremental deployment in that implementation of microloop protection by label advertisement suppression in the control plane of a given router need not impact the operation of other routers within the system.

Figure 3:
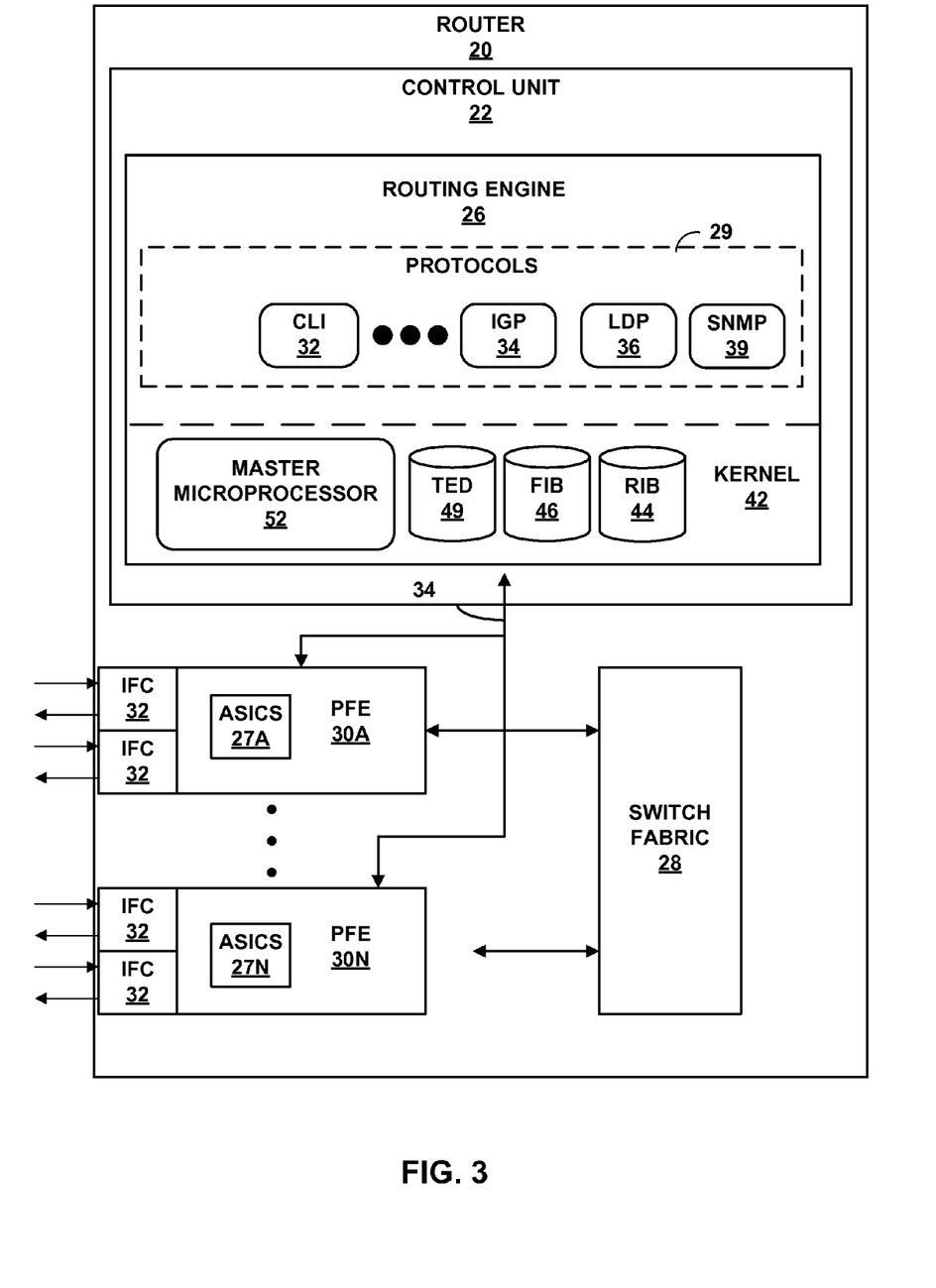
FIG. 3 is a block diagram illustrating an exemplary router capable of providing microloop protection.

FIG. 3 is a block diagram illustrating an exemplary router capable of providing microloop protection in MPLS networks in accordance with the techniques described herein. Router 20 may comprise any router in a network, such as network 10. For example, router 20 may comprise a source router, a PLR router, a destination router, or any transit router illustrated in FIGS. 1-2.

In the example of FIG. 3, router 20 includes control unit 22 in which routing engine 26 provides control plane functionality for router 20. Router 20 also includes a plurality of packet-forwarding engines 30A-30N ("PFEs 30") and a switch fabric 28 that collectively provide a data plane for forwarding network traffic. PFEs 30 receive and send data packets via interface cards 32 ("IFCs 32"). In other embodiments, each of PFEs 30 may comprise more or fewer IFCs. Although not shown, PFEs 30 may each comprise a central processing unit (CPU) and a memory. In this example, routing engine 26 is connected to each of PFEs 30 by a dedicated internal communication link 34. For example, dedicated link 34 may comprise a Gigabit Ethernet connection. Switch fabric 28 provides a high-speed interconnect for forwarding incoming data packets between PFEs 30 for transmission over a network. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

Routing engine 26 provides an operating environment for execution of various protocols 29 that may comprise software processes having instructions executed by a computing environment. As described in further detail below, protocols 29 provide control plane functions for storing network topology in the form of routing tables or other structures, executing routing protocols to communicate with peer routing devices and maintain and update the routing tables, and providing management interface(s) to allow user access and configuration of router 20. Control unit 22 provides an operating environment for routing engine 26 and may be implemented solely in software, or hardware, or may be implemented as a combination of software, hardware or firmware. For example, control unit 22 may include one or more processors which execute software instructions. In that case, routing engine 26 may include various software modules or daemons (e.g., one or more routing protocol processes, user interfaces and the like), and control unit 22 may include a computer-readable storage medium, such as computer memory or hard disk, for storing executable instructions.

Command line interface daemon 32 ("CLI 32") provides an interface by which an administrator or other management entity may modify the configuration of router 20 using text-based commands. Simple Network Management Protocol daemon 39 ("SNMP 39") comprises an SNMP agent that receives SNMP commands from a management entity to set and retrieve configuration and management information for router 20. Using CLI 32 and SNMP 39, management entities may enable/disable and configure services, install routes, enable/disable and configure rate limiters, and configure interfaces, for example.

One or more routing protocols, such as IGP 34, maintains routing information in the form of routing information base (RIB) 44 that describes a topology of a network, and derives a forwarding information base (FIB) 44 in accordance with the routing information. In general, the routing information represents the overall topology of the network. IGP 34 interacts with kernel 42 (e.g., by way of API calls) to update routing information base (RIB) 44 based on routing protocol messages received by router 20. RIB 44 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, FIB 46 is generated based on selection of certain routes within the network and maps packet key information (e.g., destination information and other select information from a packet header) to one or more specific next hops and ultimately to one or more specific output interface ports of IFCs 31, 32. Routing engine 26 may generate the FIB in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

LDP 36 executes the Label Distribution Protocol to exchange MPLS labels for enabling label-based packet forwarding as described herein. In one example, LDP 36 operates in conformance with specifications set forth in in Andersson, L., et al, "LDP Specification", RFC 3036, January 2001, and/or Andersson, L., et al, "LDP Specification", RFC 5036, October 2007, the entire contents of each being incorporated herein by reference.

Routing engine 26 communicates data representative of a software copy of the FIB into each of PFEs 30 to control forwarding of traffic within the data plane. This allows the software FIB stored in memory (e.g., RAM) in each of PFEs 30 to be updated without degrading packet-forwarding performance of router 20. In some instances, routing engine 26 may derive separate and different software FIBs for each respective PFEs 30. In addition, one or more of PFEs 30 include application-specific integrated circuits (ASICs 27) that PFEs 30 program with a hardware-copy of the FIB based on the software FIBs (i.e., hardware versions of the software FIBs) copied to each respective PFE 30.

For example, kernel 43 executes on master microprocessor 52 and may comprise, for example, a UNIX operating system derivative such as Linux or Berkeley Software Distribution (BSD). Kernel 42 processes kernel calls from IPG 34 and LDP 36 to generate forwarding information in the form of FIB 46 based on the network topology represented in RIB 44, i.e., performs route resolution and path selection. Typically, kernel 42 generates FIB 46 in the form of radix or other lookup trees to map packet information (e.g., header information having destination information and/or a label stack) to next hops and ultimately to interface ports of interface cards associated with respective PFEs 30. FIB 46 may associate, for example, network destinations with specific next hops and corresponding IFCs 32. For MPLS-related traffic forwarding, FIB 46 stores, for a given FEC, label information that includes an incoming label, an outgoing label, and a next hop for a packet. According to the techniques of this disclosure, FIB 64 may be generated to further store, for each next hop, a set of excluded input interfaces for which inbound traffic destined for the FEC is not to be forward but, instead, discarded.

Master microprocessor 52 executing kernel 42 programs PFEs 30 to install copies of the FIB 46. Microprocessor 52 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, ASICs 27 are microcode-controlled chipsets (i.e., forwarding circuits) programmably configured by a slave microprocessor executing on each of PFEs 30. When forwarding packets, control logic with each ASIC 27 traverses the forwarding information (FIB 46) received from routing engine 26 and, upon reaching a FIB entry for the packet (e.g., a leaf node), microcode-implemented control logic 56 automatically selects a forwarding next hop and processes the packets in accordance with the operations defined within the next hop. In this way, ASICs 27 of PFEs 30 process packets by performing a series of operations on each packet over respective internal packet forwarding paths as the packets traverse the internal architecture of router 20. Operations may be performed, for example, on each packet based on any of a corresponding ingress interface, an ingress PFE 30, an egress PFE 30, an egress interface or other components of router 20 to which the packet is directed prior to egress, such as one or more service cards. PFEs 30 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PFEs 30 arranges forwarding structures as next hop data that can be chained together as a series of "hops" along an internal packet forwarding path for the network device. In many instances, the forwarding structures perform lookup operations within internal memory of ASICs 27, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 27 determines the manner in which a packet is forwarded or otherwise processed by PFEs 30 from its input interface on one of IFCs 32 to its output interface on one of IFCs 32.

In accordance with the techniques described herein, when performing a packet forwarding operation, ASICs 27 provide microloop protection for MPLS-related traffic. For example, ASICs 27 of PEs 30 prevent MPLS traffic destined for the FEC to be forwarded when the traffic was received on any interface within the set of excluded input interfaces for that FEC.

For example, in reference to source router 14A of FIG. 1, LDP 36 executing on the source router may allocate and announce label "300" for use in forwarding traffic to the FEC associated with destination router 14D. In addition, as explained above, kernel 42, or IGP 34 executing on the kernel, may process RIB 44 to compute the shortest path to destination router 14D as {14A, 14B, 14C, 14D} and select router 14B as a next hop to which to forward network packet 16 destined for destination router 14D. Kernel 42 generates FIB 46 to include next hop information as well as the list of excluded references (i.e., interface 17 in this example) and installs FIB 46 to ASICs 27A. Upon receiving a network packet 16 destined for destination router 14D, the receiving one of ASICs 27 (e.g., ASIC 27A) of source router 14A perform a lookup to select a next hop forwarding structure associated with the traffic. At this time, ASIC 27A applies the list of excluded interfaces associated with the selected next hop forward structure. In the event the inbound network packet was received on an input interface that matches an interface on the list of excluded interfaces (e.g., interface 17 in the example of FIG. 1), ASIC 27A does not forward the packet to the output interface identified by the lookup but instead discards the packet. In the event the inbound network packet was received on an input interface that is not on the list of excluded interfaces, ASIC 27A shapes the packet to have the appropriate MPLS label and forwards the packet to the output interface identified in the next hop forwarding structure selected by the lookup. In this way, an exclusion list computed by routing engine 26 and installed within PFEs 30 of router 20 operates to protect against a microloop that may otherwise be created in the event a downstream router located along the selected shortest path detects and reacts to a link failure (e.g., failure of link 15) before router 20.

In some embodiments router 20 may conform to the example operation described above with respect to FIG. 3. In such examples, LDP 36 operates in accordance with a modified signaling process when advertising a label to be used in reaching a given FEC. That is, LDP 36 of suppresses the advertisement of labels from any interface that leads along a selected shortest path to the destination.

The architecture of router 20 illustrated in FIG. 3 is shown for exemplary purposes only. This disclosure is not limited to this architecture. In other examples, router 20 may be configured in a variety of ways. In one example, some of the functionally of control unit 22 may be distributed within IFCs 34. Control unit 82 may be implemented solely in software, or hardware, or may be implemented as a combination of software, hardware, or firmware. For example, control unit 22 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 22 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

Figure 4:
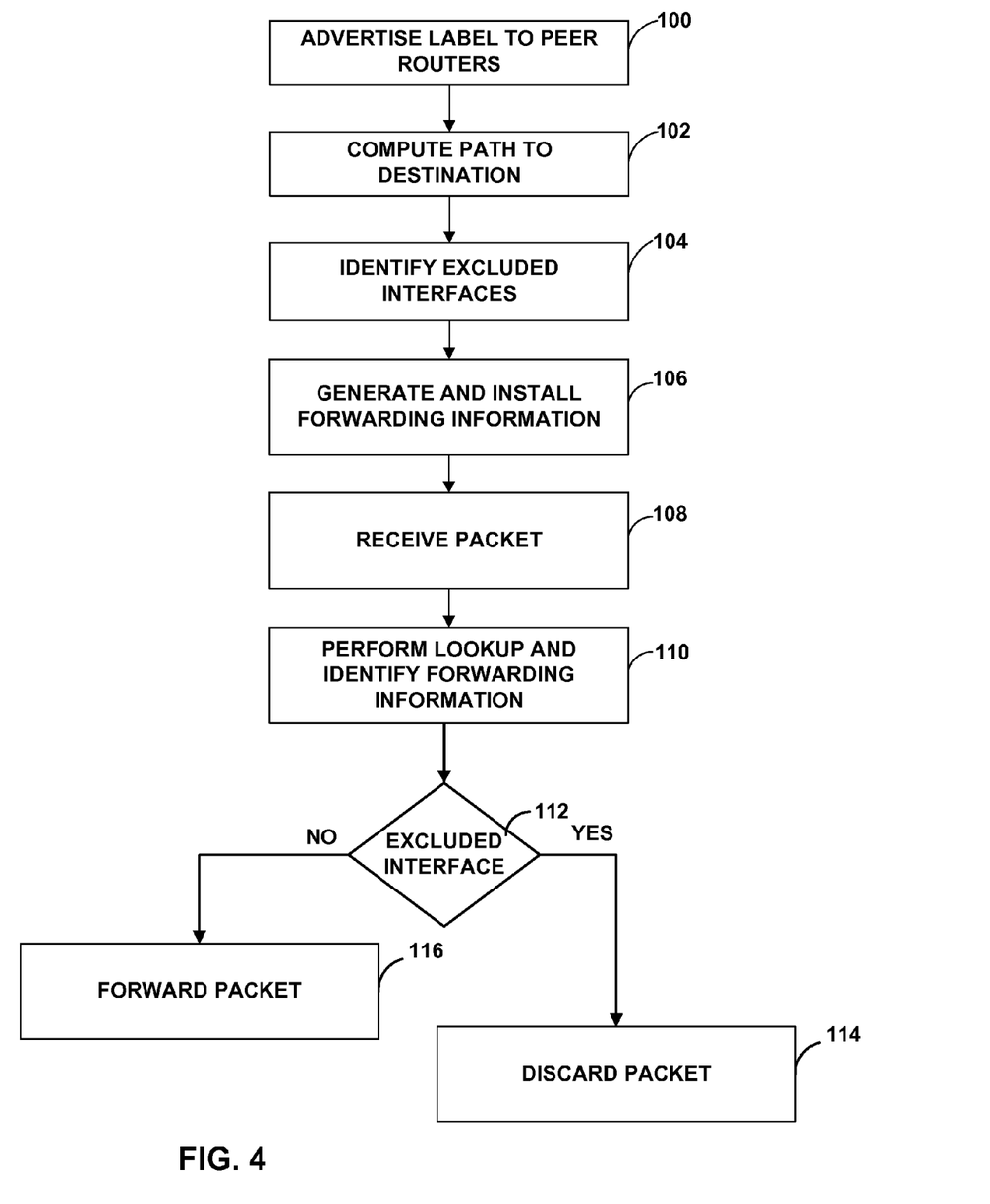
FIG. 4 is a flowchart illustrating exemplary operation of a label switching router, in accordance with the techniques described herein.

FIG. 4 is a flowchart illustrating exemplary operation of a label switching router, such as an of a source router, a PLR router, a destination router, or any transit router illustrated in FIGS. 1-2. As shown in FIG. 4, a router advertises, out each of a plurality of network interfaces of a label switching router and via a respective label distribution protocol (LDP) label mapping message, a label to be used in forwarding to the label switching router traffic to a destination within a network (100). In addition, the router computes a path within the network to be used when forwarding the network traffic from the label switching router to the destination within the network (102). After computing the path, the router identifies a set of excluded interfaces that includes one or more of the network interfaces that couple the router to network links leading to a next hop label switching router along the path to the destination (104). In addition, the router generates forwarding information and installs the forwarding information including the set of excluded interfaces within a forwarding circuit of the router (106).

Upon receiving a packet on one of the network interfaces that includes the label advertised by the label switching router (108), a forwarding circuit (e.g., a forwarding ASIC, PFE or other hardware component) performs a route lookup to select forwarding information for forwarding the packet to the destination. The forwarding information identified via the route lookup specifies the set of excluded interfaces (110).

The forwarding circuit compares the network interface on which the packet was received with the set of excluded interfaces to determine whether the network interface from which the packet was received is among the set of excluded interfaces (112). The router discards the packet if the network interface from which the packet was received corresponds to the path computed by the label switching router to be used when forwarding network traffic from the label switching router to the destination (114). That is, the forwarding circuit discards the packet when a result of the comparison indicates that the network interface from which the packet was received is among the set of excluded interfaces.

Alternatively, the forwarding circuits forwards the packet when the network interface from which the packet was received does not correspond to the path computed by the label switching router to be used when forwarding network traffic from the label switching router to the destination within the network (116).

Various examples of the techniques of the disclosure have been described. These and other examples are within the scope of the following claims.

The invention claimed is:

1. A method comprising:
   advertising, out each of a plurality of network interfaces of a label switching router and via a respective label distribution protocol (LDP) label mapping message, a label to be used in forwarding to the label switching router traffic to a destination within a network,
   computing, with the label switching router, a path within the network to be used when forwarding the network traffic from the label switching router to the destination within the network,
   receiving, a packet on one of the network interfaces of the label switching router, wherein the packet includes the label advertised by the label switching router; and
   discarding, with the label switching router, the packet when the network interface from which the packet was received is an output interface to the path computed by the label switching router to be used when forwarding network traffic from the label switching router to the destination.

2. The method of claim 1, comprising forwarding the packet when the network interface from which the packet was received is not an output interface to the path computed by the label switching router to be used when forwarding network traffic from the label switching router to the destination within the network.

3. The method of claim 1, further comprising:
responsive to computing the path, identifying, with the label switching router, a set of excluded interfaces that includes one or more of the network interfaces that couple the label switching router to network links leading to a next hop label switching router along the path to the destination,
wherein discarding the packet comprises discarding the packet when the network interface from which the packet was received is among the set of excluded interfaces.

4. The method of claim 3, further comprising:
installing the set of excluded interfaces within a forwarding circuit within the label switching router; and
comparing, with the forwarding circuit, the network interface on which the packet was received with the set of excluded interfaces to determine whether the network interface from which the packet was received is among the set of excluded interfaces,
wherein discarding the packet comprises discarding the packet with the forwarding circuit when a result of the comparison indicates that the network interface from which the packet was received is among the set of excluded interfaces.

5. The method of claim 4, further comprising:
upon receiving the packet, performing a route lookup with the forwarding circuit to select forwarding information for forwarding the packet to the destination, wherein the forwarding information specifies the set of excluded interfaces identified by the label switching router.

6. The method of claim 3, wherein the set of excluded interfaces comprises a plurality of excluded interfaces that couple the label switching router to a plurality of network links leading to the next hop label switching router along the path to the destination.

7. A label switching router comprising:
a plurality of network interfaces,
a routing engine comprising a processor executing a label distribution protocol configured to advertise, out each of the plurality of network interfaces, a label to be used by peer label switching routers when forwarding, to the label switching router, network traffic associated with a destination within a network; and
a forwarding circuit programmed with forwarding information associated with a path within the network for forwarding the network traffic from the label switching router to the destination,
wherein the forwarding circuit receives a packet on one of the network interfaces, the packet including the label advertised by the label switching router, and discards the packet when the network interface from which the packet was received is an output interface to the path specified by the forwarding information to be used when forwarding network traffic from the label switching router to the destination.

8. The label switching router of claim 7, wherein the forwarding circuit forwards the packet when the network interface from which the packet was received is not an output interface to the path specified within the forwarding information to be used when forwarding network traffic from the label switching router to the destination.

9. The label switching router of claim 7,
wherein the routing engine computes the path to be used when forwarding the network traffic from the label switching router to the destination within the network, identifies a set of excluded interfaces that includes one or more of the network interfaces that couple the label switching router to network links leading to a next hop label switching router along the path to the destination, and installs the set of excluded interfaces along with the forwarding information into the forwarding circuit, and
wherein the forwarding circuit discards the packet when the network interface from which the packet was received is among the set of excluded interfaces.

10. The label switching router of claim 9, wherein the forwarding circuit compares the network interface on which the packet was received with the set of excluded interfaces to determine whether the network interface from which the packet was received is among the set of excluded interfaces and discards the packet with the forwarding circuit when a result of the comparison indicates that the network interface from which the packet was received is among the set of excluded interfaces.

11. The label switching router of claim 10, wherein, upon receiving the packet, the forwarding circuit performs a route lookup to select forwarding information for forwarding the packet to the destination and retrieves, as part of the forwarding information, the set of excluded interfaces identified routing engine.

12. A method comprising:
computing, with a label switching router, a path within a network to be used when forwarding network traffic from the label switching router to a destination within the network;
allocating, with the label switching router, a label to be used in forwarding, to the label switching router, the network traffic destined for the destination within the network;
advertising, out each of a plurality of network interfaces of the label switching router and via a respective label distribution protocol (LDP) label mapping message, the label to be used in forwarding the network traffic to the label switching router; and
suppressing, with the label switching router, output of the LDP label mapping messages from one or more network interfaces of the label switching router that are output interfaces to the path computed by the label switching router to be used when forwarding the network traffic from the label switching router to the destination.

13. The method of claim 12, further comprising:
receiving, a packet on one of the network interfaces of the label switching router, wherein the packet includes the label advertised by the label switching router; and
forwarding the packet.

14. The method of claim 12, wherein suppressing the LDP label mapping messages from one or more network interfaces comprises:
after computing the path, identifying, with the label switching router, a set of excluded interfaces that includes one or more of the network interfaces that couple the label switching router to network links leading to a next hop label switching router along the path to the destination; and suppressing the LDP label mapping messages from being output on the set of excluded interfaces.

15. The method of claim 12, further comprising receiving, with a label switching router, a label distribution protocol (LDP) request message from a peer label switching router, wherein the LDP request message requests a label to be used in forwarding traffic to a destination within a network.

* * * * *